M. R. KINTZING & B. W. HOPPER.
Horseshoes.
No. 158,284.  Patented Dec. 29, 1874.
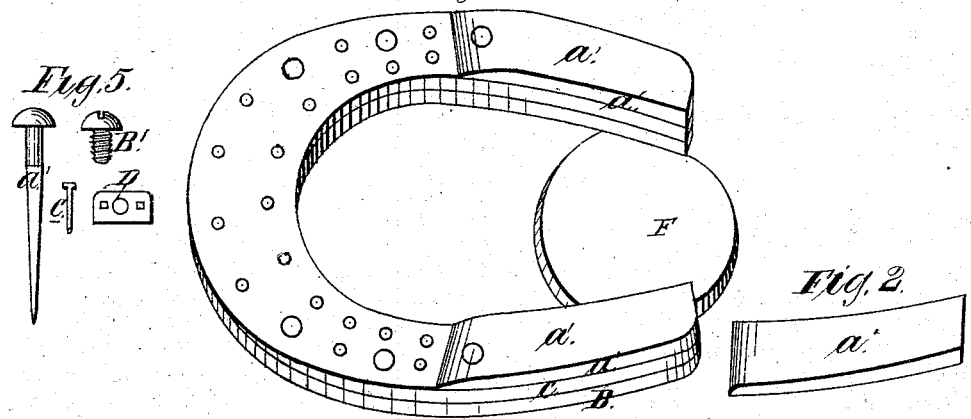
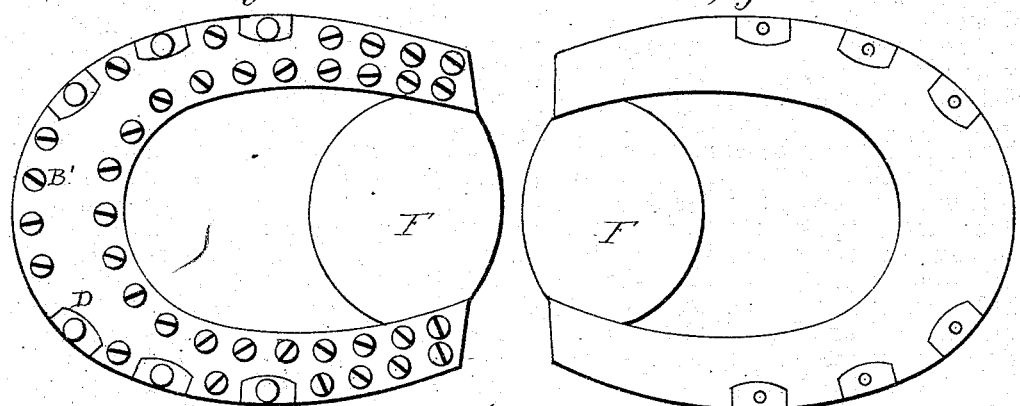
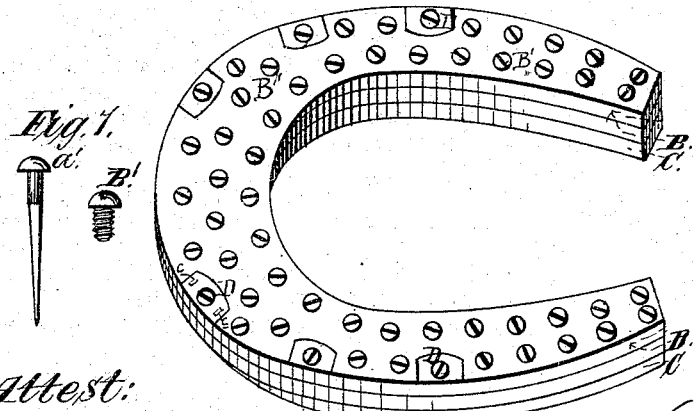
Attest:
E. Inard McCann
Francis B. Lee
Inventor:
Mathew R. Kintzing
Bernard W. Hopper

UNITED STATES PATENT OFFICE.

MATHEW R. KINTZING AND BERNARD W. HOPPER, OF PHILADELPHIA, PENNSYLVANIA.

IMPROVEMENT IN HORSESHOES.

Specification forming part of Letters Patent No. 158,284, dated December 29, 1874; application filed May 5, 1874.

*To all whom it may concern:*

Be it known that we, MATHEW R. KINTZING and BERNARD W. HOPPER, both of the city and county of Philadelphia, State of Pennsylvania, have invented an Improved Horseshoe, of which the following is a specification:

The object of our invention is to produce a light, durable, and elastic horseshoe, which shall more effectually protect the hoof, and be easier and more comfortable for the horse than ordinary horseshoes of metal. We attain this object by constructing the shoe of one or more sections or layers of tanned leather, waterproofed, hardened, and compressed, as fully described hereafter, the said shoe being also preferably studded with steel-headed screws, and lined on the side next to the hoof with vulcanized rubber or other elastic material.

In the accompanying drawing, Figure 1 represents a perspective view of our improved horseshoe viewed from the inner side; Fig. 2, a detached perspective view of one of the rubber strips or cushions; Figs. 3 and 4, plan views of the shoe, the former without, the latter with, the steel studding-screws; Figs. 5 and 7, views of the nails, screws, and eyelets, or washers, used in connection with the shoe; and Fig. 6, a perspective view of the complete shoe viewed from the outer side.

The best quality of oak-tanned leather is used in the construction of the shoe, preferably English sole-leather, and this is prepared by first soaking it in a mixture of gum-copal and turpentine, or copal-varnish, by which means it is thoroughly water proofed, the leather being next dried and subjected to pressure between rolls, which condenses and hardens it. The leather is then cut into strips of the shape of ordinary horseshoes, one strip sufficing for the shoe for very light work, or when the leather is of unusual thickness. We prefer, however, in most cases to make the shoe of two sections or layers, B and C, as shown in the drawing, the latter section, which is to be next to the hoof, being perfectly plain, while the ends of the outermost section, B, are joined by a cross-piece, F, of leather, which constitutes a heel-strengthener, as hereafter described. This cross-piece may, however, be dispensed with in some instances. The adjoining surfaces of the two layers, having been roughened, are united by india-rubber cement, and are subjected to powerful pressure until dry, when the union will be found to be perfect. Holes are next bored in the edges of the shoe for the passage of the nails, by which the latter is secured to the hoof, the fastening-nails being prevented from sinking into the leather by metal eyelets or washers D, secured to the shoe by sprigs c. The shoe is also studded with heavy-headed steel screws B', which are, in the present instance, arranged in two rows, and which should extend through both layers of leather, although this is not essential. The projecting heads of these screws give the horse a firm hold upon the ground, and prevent slipping under any circumstances. Finally, strips a a, of vulcanized india-rubber or other elastic material, are secured to the inner layer of the shoe by india-rubber cement, a perfect union being insured by subjecting the whole to pressure until dry.

The shoe is now ready for use, and is secured to the hoof by wrought-nails a', the heads of which are, preferably, made of the same shape as those of the studding-screws B'.

Compared with ordinary horseshoes of metal, our improved shoe possesses the advantages of greater lightness and durability, and of being much safer and more comfortable for the horse, both while on the road and when standing.

The metal shoe, being perfectly unyielding, is continually forced against and bruises the heel and frog of the hoof at every step of the horse when traveling over hard roads. This is effectually prevented by the cushion of rubber which we interpose between the shoe and hoof. This cushion also imparts such elasticity to the shoe that the horse can travel greater distances than usual without tiring, and by its use the speed of racing-horses can also be increased.

The leather cross-piece F protects and prevents injury of the heel or frog by nails, broken glass, sharp stones, &c.

Although temporary shoes or covers designed for horses having hoof-bound or tender feet have been made of leather, the latter has never heretofore received the preliminary treatment requisite to make a durable and permanent shoe, (to be substituted for those of iron,) such as forms the subject of this application.

Without claiming, broadly, a leather horseshoe,

We claim as our invention—

A horseshoe consisting of waterproofed hardened leather, lined in whole or in part with vulcanized rubber, and provided with steel lugs projecting from the wearing-surface, and with or without eyeleted openings for the passage of the nails, all as set forth.

MATHEW R. KINTZING.
   BERNARD W. HOPPER.

Witnesses:
 EDWARD McCANN,
 FRANCIS BLEE.